(12) United States Patent
Peters et al.

(10) Patent No.: US 11,002,597 B2
(45) Date of Patent: May 11, 2021

(54) SOLAR SPECTRUM SENSOR FOR DETERMINING VALUE OF SOLAR SPECTRUM BASED ON DETERMINED AVERAGE PHOTON ENERGY

(71) Applicants: MASSACHUSETTS INSTITUTE OF TECHNOLOGY, Cambridge, MA (US); NATIONAL UNIVERSITY OF SINGAPORE, Singapore (SG)

(72) Inventors: Ian Marius Peters, Cambridge, MA (US); Tonio Buonassisi, Cambridge, MA (US); Haohui Liu, Singapore (SG); Sterling Watson, Cambridge, MA (US); Nasim Sahraei Khanghah, Singapore (SG); Anthony Pennes, Cambridge, MA (US); Zekun Ren, Singapore (SG)

(73) Assignees: MASSACHUSETTS INSTITUTE OF TECHNOLOGY, Cambridge, MA (US); NATIONAL UNIVERSITY OF SINGAPORE, Singapore (SG)

( * ) Notice: Subject to any disclaimer, the term of this patent is extended or adjusted under 35 U.S.C. 154(b) by 261 days.

(21) Appl. No.: 16/333,223

(22) PCT Filed: Sep. 13, 2017

(86) PCT No.: PCT/SG2017/050460
§ 371 (c)(1),
(2) Date: Mar. 13, 2019

(87) PCT Pub. No.: WO2018/052372
PCT Pub. Date: Mar. 22, 2018

(65) Prior Publication Data
US 2019/0331525 A1 Oct. 31, 2019

Related U.S. Application Data

(60) Provisional application No. 62/393,686, filed on Sep. 13, 2016.

(51) Int. Cl.
*G01J 1/42* (2006.01)
*G01J 1/16* (2006.01)
(Continued)

(52) U.S. Cl.
CPC ............ *G01J 1/1626* (2013.01); *H02S 50/15* (2014.12); *G01J 2001/4266* (2013.01); *G01J 2001/446* (2013.01); *G01J 2003/066* (2013.01)

(58) Field of Classification Search
CPC ........ H02S 50/15; H02S 50/00; G01J 1/1626; G01J 1/42; G01J 2001/4266; Y02E 10/50
(Continued)

(56) References Cited

U.S. PATENT DOCUMENTS 4,449,057 A * 5/1984 Ishiwata ........... H01L 31/02021
307/43
2016/0254782 A1 9/2016 Leary

FOREIGN PATENT DOCUMENTS

DE 102012022052 A1 5/2014

OTHER PUBLICATIONS

Chantana, J., et al. "Uniqueness verficiation of direct solar spectral index for estimating outdoor performance of concentrator photovoltaic systems" Renewable Energy, Nov. 14, 2014, vol. 75, pp. 762-766 [Retrieved on Oct. 23, 2017]<DOI:10/1016/J.RENENE.2014.10.059> Entire document.
(Continued)

*Primary Examiner* — Que Tan Le
(74) *Attorney, Agent, or Firm* — Volpe Koenig (57) ABSTRACT

A solar spectrum sensor, a consumer device and a method for determining an ambient solar spectrum. The solar spectrum sensor comprises a sensor unit configured for generating respective photo current outputs responsive to different parts of the solar spectrum; a measurement unit configured for measuring the respective photo current outputs from the
(Continued)

sensor unit; and a processing unit for determining an average photon energy, APE, value of the solar spectrum from the measured photo current outputs and for determining the solar spectrum based on the determined APE.

12 Claims, 7 Drawing Sheets

(51) Int. Cl.
  *H02S 50/15* (2014.01)
  *G01J 1/44* (2006.01)
  *G01J 3/06* (2006.01)
(58) Field of Classification Search
  USPC .............................. 250/203.4, 214 R, 214.1
  See application file for complete search history.

(56) References Cited

OTHER PUBLICATIONS

Cornaro, C., et al. "Solar spectral irradiance measurements relevant to photovoltaic applications" Proceedings of the Third international Conference on Applied Energy, Perugia, Italy, May 16-18, 2011, May 18, 2011, pp. 3541-3550 [Retrieved on Oct. 23, 2017]<DOI:Not Available> Entire document.

Faine, P., et al. "The influence of spectral solar irradiance variations on the performance of selected single-junction and multifunction solar cells," Solar Cells, vol. 31, pp. 259-278, 1991.
International Electrotechnical Commission (IEC), "Photovoltaic system performance monitoring—Guidelines for measurement, data exchange and analysis" IEC 61724, 1998.
Kataoka, N., et al. "Evaluation of solar spectral irradiance distribution using an index from a limited range oft he solar spectrum" Current Applied Physics, Mar. 15, 2014, vol. 14, pp. 731-737. [Retrieved on Oct. 23, 2017] <DOI:10.1016/J.CAP.2014.03.004> Entire document.
Kinsey, G.S. "Spectrum Sensitivity, Energy Yield, and Revenue Prediction of PV Modules" IEEE Journal of Photovoltaics, vol. 5, pp. 258-262, 2015.
Minemoto, T., et al. "Uniqueness verification of solar spectrum index of average photon energy for evaluating outdoor performance of photovoltaic modules" Solar Energy, vol. 83, pp. 1294-1299, 2009.
Mueller, R., et al. "A New Algorithm for the Satellite-Based Retrieval of Solar Surface Irradiance in Spectral Bands" Remote Sensing, vol. 4, p. 622, 2012.
Reich, N.H., et al. "Performance ratio revisited: is PR > 90% realistic?" Progress in Photovoltaics: Research and Applications, vol. 20, pp. 717-726, 2012.
Ying, Y. Jia, et al. "Effect of Solar Spectrum on the Performance of Various Thin-Film PV Module Technologies in Tropical Singapore" Photovoltaics, IEEE Journal of, vol. 4, pp. 1268-1274, 2014.

* cited by examiner

SOLAR SPECTRUM SENSOR FOR DETERMINING VALUE OF SOLAR SPECTRUM BASED ON DETERMINED AVERAGE PHOTON ENERGY

FIELD OF INVENTION

The present invention relates broadly to a solar spectrum sensor, a consumer device, and to a method for determining an ambient solar spectrum.

BACKGROUND

The internet of things (IoT) promises to revolutionize our ability to harvest, assimilate, and derive value from data. Sensors are the eyes and ears of the IoT. One group of sensors seeks to sense or determine the shape of the solar spectrum.

In one application example, spectral composition of incoming solar irradiance is valuable information for PV applications. Solar cell outputs show nontrivial variation with changing spectra [1]. This is especially so for multi-junction solar cells, due to their increased spectrum sensitivity from current mismatch effects [2, 3]. Therefore, information about incoming solar spectrum is desired in order to accurately determine the yield of solar cells or modules.

Another implication of the incoming solar irradiance is on the in-plane irradiance measurement for solar modules. Irradiance measurement is important for monitoring the performance ratio (PR) of the PV system [4]. A pyranometer (which employs a thermocouple) can accurately measure the broadband irradiance with virtually no spectral selectivity and very low directional errors, but a calibrated Si reference cell (namely, sensor) is widely used instead for its faster response and much lower cost [5]. Irradiance measured with a Si reference cell is influenced by spectral effects due to the non-uniform spectral response of the reference cell. Therefore, the PRs derived from pyranometer and reference cell measurements are different [5]. Information on the incoming spectrum is thus desired to obtain the real irradiance and PR.

Spectrum data is less widely available compared to, e.g., broadband irradiance data. Efforts are still being made to improve the accuracy of satellite derived spectrum data [6]. In comparison, ground-based spectrum measurement is more accurate, more reliable, and offers better coverage with higher time resolution. However, such measurements using existing spectroradiometers are inconvenient and expensive.

Embodiments of the present invention provide a solar spectrum sensor, a consumer device, and a method for determining an ambient solar spectrum that seek to address at least one of the above problems.

SUMMARY

In accordance with a first aspect of the present invention, there is provided a solar spectrum sensor comprising a sensor unit configured for generating respective photo current outputs responsive to different parts of the solar spectrum; a measurement unit configured for measuring the respective photo current outputs from the sensor unit; and a processing unit for determining an average photon energy, APE, value of the solar spectrum from the measured photo current outputs and for determining the solar spectrum based on the determined APE.

In accordance with a second aspect of the present invention, there is provided a consumer device comprising a solar spectrum sensor of the first aspect.

In accordance with a third aspect of the present invention, there is provided a method for determining an ambient solar spectrum, the method comprising generating two or more respective photo current outputs responsive to different parts of the solar spectrum; measuring the two or more photo current outputs; determining an average photon energy, APE, value of the solar spectrum from the measured photo current outputs; and determining the solar spectrum based on the determined APE.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

Embodiments of the present invention provide a solar spectrum sensor—i.e. a device that estimates the shape of the solar spectrum in the form of intensity or photon flux per wavelength. In one embodiment, the spectrum sensor comprises two or more photo-sensors with sensitivities in different parts of the solar spectrum, a measurement device to measure the output of the photosensors, a computation device to calculate functions from the measured data, a look-up device that relates these functions to the shape of a spectrum. The algorithm used in an example embodiment to calculate the characteristic functions and relate them to the shape of the spectrum will be described below in more detail.

Embodiments of the present invention advantageously determine the spectral shape of the spectrum by making use of the recognition that the shape of the spectrum is uniquely linked to its average photon energy (APE), which is given by a single value. Embodiments of the present invention provide a method to predict the APE by relating the output of a small number (two or more) of photodetectors to each other. Using this method, embodiments advantageously only use a small number of key components to perform the necessary measurements and calculations to obtain the shape of the spectrum. This, in turn, allows fabrication of spectrum sensors according to example embodiments with smaller form factors, smaller weight, and at a reduced price compared to devices currently available in the market.

Embodiments of the present invention can enable measurements of the solar spectrum for photovoltaic (PV) applications or meteorology, measuring haze or smog, measuring air quality, measuring humidity, measuring UV exposure (which can be used to recommend countermeasures like a certain sun-blocker), or generally measuring optical properties of the ambient light.

Figure 1A:
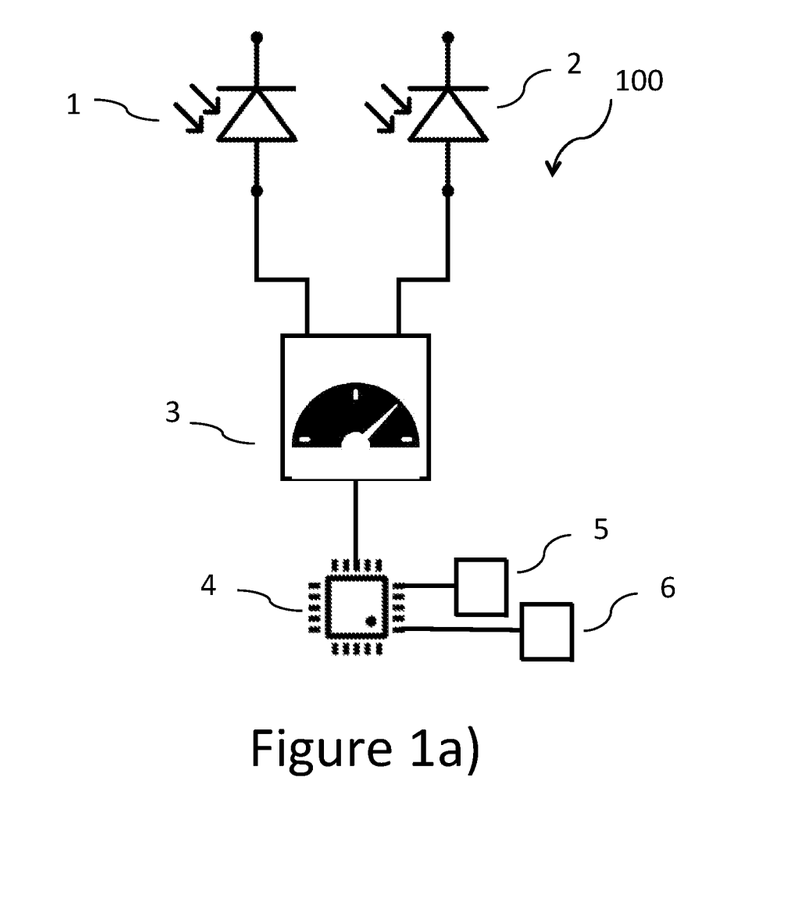
FIG. 1a) shows a schematic drawing illustrating a spectrum sensor according to an example embodiment.

FIG. 1a) shows a schematic drawing illustrating a spectrum sensor 100 according to an example embodiment. A sensor unit in the form of two photodiodes 1 and 2 is provided. These photodiodes 1, 2 are preferably sensitive to different parts of the solar spectrum. This can for example be achieved by making them from two different materials, or by making them from the same material and capping them with optical filters with different transmissivity so that they react differently to the available solar resource. The diodes 1, 2 generate a current and voltage response depending on the incident light conditions. The photodiodes 1, 2 can especially be solar cells in one embodiment. While in a currently preferred embodiment, the solar cells are made of Si and InGaP, other materials can be used in different embodiments, including, but not limited to, CdTe, CIGS, GaAs, GaAsP, AlGaAs, GaN, InGaN, InGaAs, GaP, perovskites, InS, GaSb, AlInP ZnO, InI, . . . .

The sensor 100 can have more than two photo-sensors or multiple of the same sensor with optical filters with different spectral transmissivities. Item 3 is a measurement device that allows measuring the current and/or voltage output of the photodiodes 1, 2. This device 3 can be a customized circuit or an off-the-shelf component. In one embodiment, this item 3 can be a customized microcontroller or and microprocessor. Item 4 is a computation device. This device 4 performs a customized algorithm in example embodiments that relates the output of the photodiodes 1, 2 to the average photon energy of the current solar spectrum. The determination is based on custom generated tables and functions for this relation. These functions advantageously allow predicting the shape of the spectrum based on a small number of measurements, as will be described in more detail below. Items 3 and 4 can be combined/integrated into one physical device/circuit. A power source (not shown) for the computation and measurements can be an external power source, a battery, and/or be advantageously provided by the solar cells used as the photodiodes 1, 2 for the measurements. The sensor 100 can comprise an internal data storage medium 5, such as a hard drive or any other form of physical structure for data storage. Alternatively, or additionally, the sensor can comprise an interface 6 for connection to an external data storage medium such as an SD card or thumbdrive or any other form of physical structure for data storage, or connection to a remote data storage medium via wired or wireless connection.

Figure 1B:
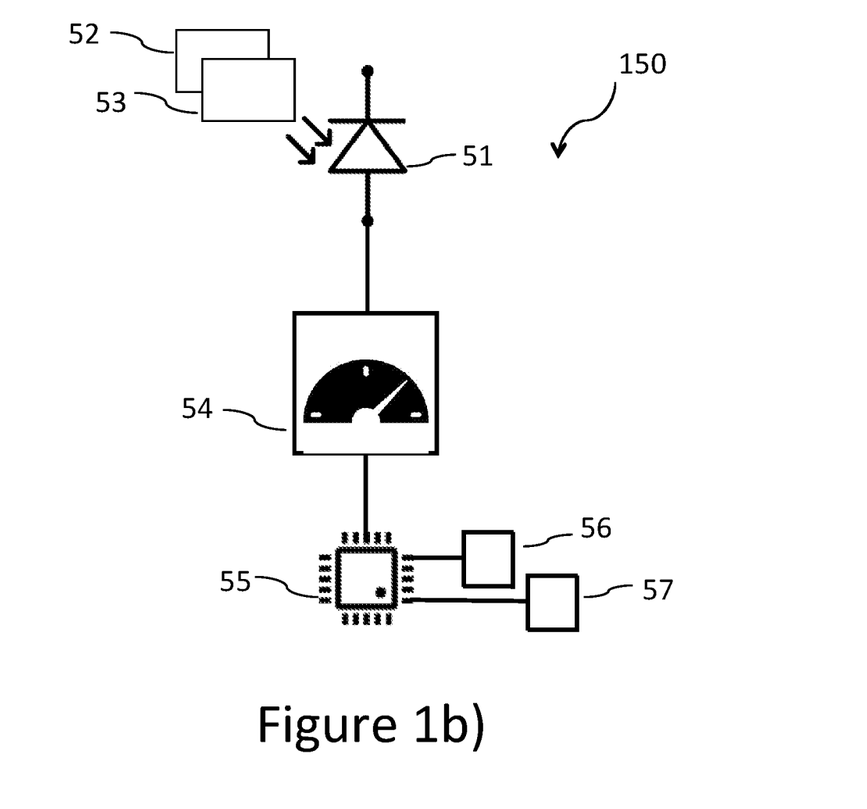
FIG. 1b) shows a schematic drawing illustrating a spectrum sensor according to another example embodiment.

FIG. 1b) shows a schematic drawing illustrating a spectrum sensor 150 according to another example embodiment. A sensor unit in the form or a photodiode 51 to which two different optical filters 52, 53 are selectively coupled is provided. The different optical filters 52, 53 may be provided as two separate filters, or may be provided in the form of a single filter, wherein the transmissivity of the single filter can be varied responsive to a control mechanism or wherein the filter is an optical instrument that divides the spectrum to two or more parts at specific wavelengths, as is understood in the art.

Item 54 is a measurement device that allows measuring the current and/or voltage output of the photodiode 51 under the different transmissivity conditions. This device 54 can be a customized circuit or an off-the-shelf component. In one embodiment, this item 54 can be a customized microcontroller or and microprocessor. Item 55 is a computation device. This device 55 performs a customized algorithm in example embodiments that relates the output of the photodiode 51 under the different transmissivity conditions to the average photon energy of the current solar spectrum. Again, the determination is based on custom generated tables and functions for this relation. These functions advantageously allow predicting the shape of the spectrum based on a small number of measurements, as will be described in more detail below. Items 54 and 55 can be combined/integrated into one physical device/circuit. A power source (not shown) for the computation and measurements can be an external power source, a battery, and/or be advantageously provided by a solar cell used as the photodiode 51 for the measurements. The sensor 150 can comprise an internal data storage medium 56, such as a hard drive or any other form of physical structure for data storage. Alternatively, or additionally, the sensor 150 can comprise an interface 57 for connection to an external data storage medium such as an SD card or thumbdrive or any other form of physical structure for data storage, or connection to a remote data storage medium via wired or wireless connection.

The photodiode 51 can be made from Si or InGaP, but other materials can be used in different embodiments, including, but not limited to, CdTe, CIGS, GaAs, GaAsP, AlGaAs, GaN, InGaN, InGaAs, GaP, perovskites, InS, GaSb, AlInP ZnO, InI, . . . .

Figure 2A:
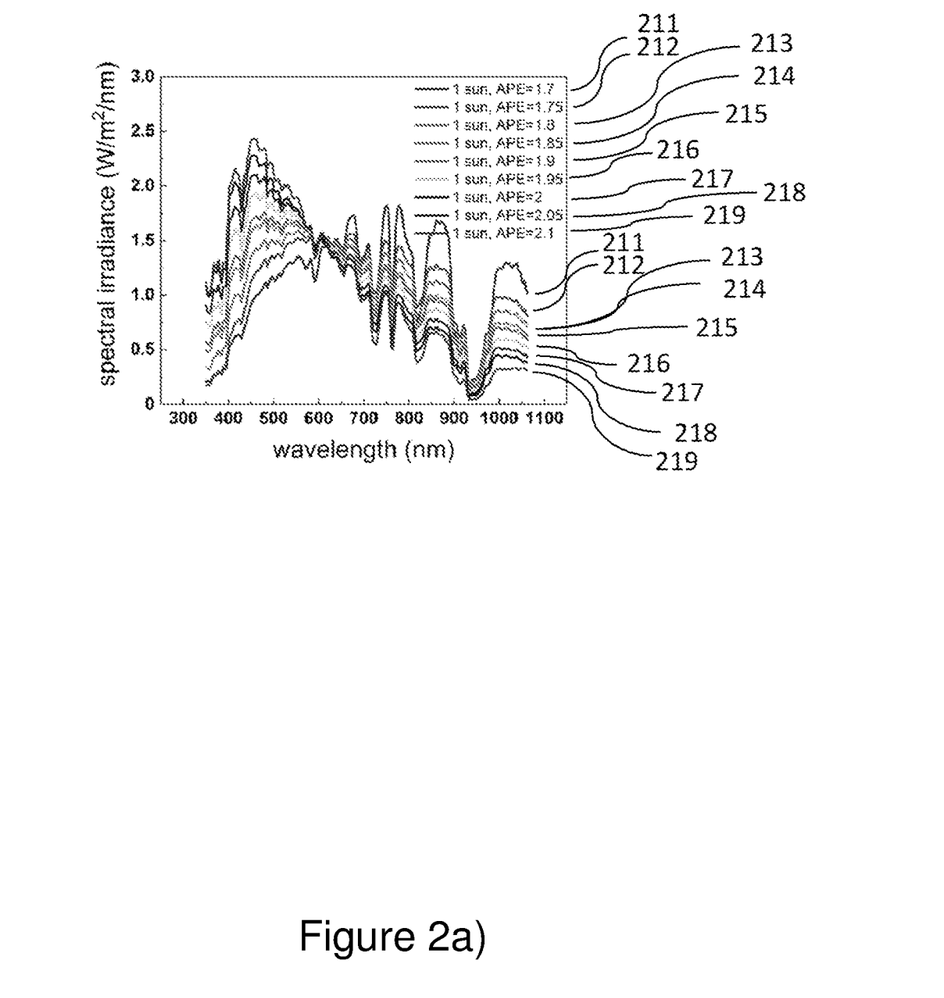
FIG. 2 shows spectra with different spectral composition in (a) Singapore and in (b) Denver, characterized by different APE ranges (values in the figure indicate the left bound of an interval).
Figure 2B:
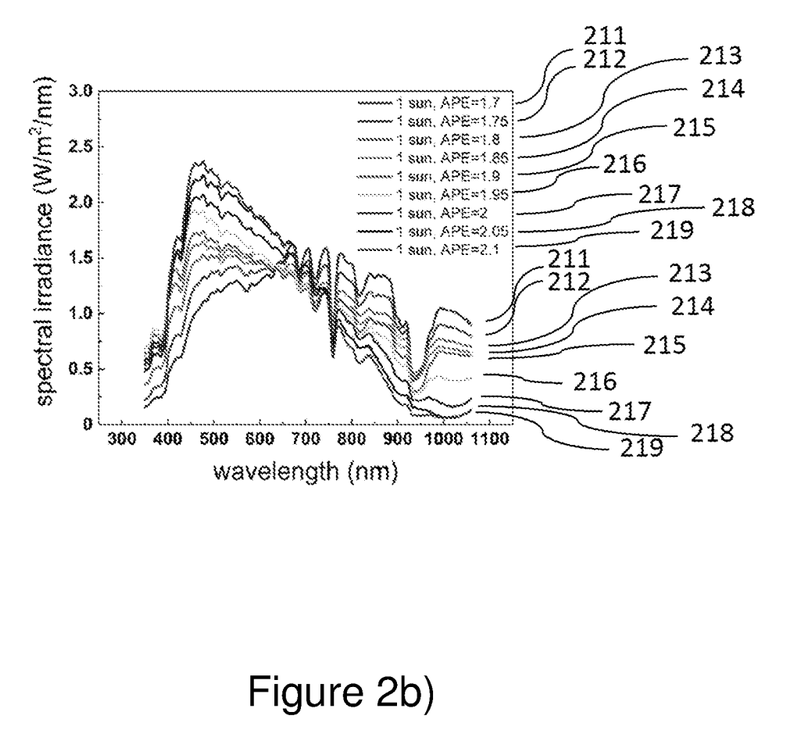

FIG. 2 shows spectra with different spectral composition in (a) Singapore (spectra 201 to 209) and in (b) Denver (spectra 211 to 219), characterized by different APE ranges (values in the figure indicate the left bound of an interval). These spectra in FIG. 2 are obtained from averaging real measured spectra. Variations of spectral composition corresponding to an APE value is found to be very limited, therefore these spectra can advantageously be taken as the characteristic set of spectra for a certain location.

Figure 3:
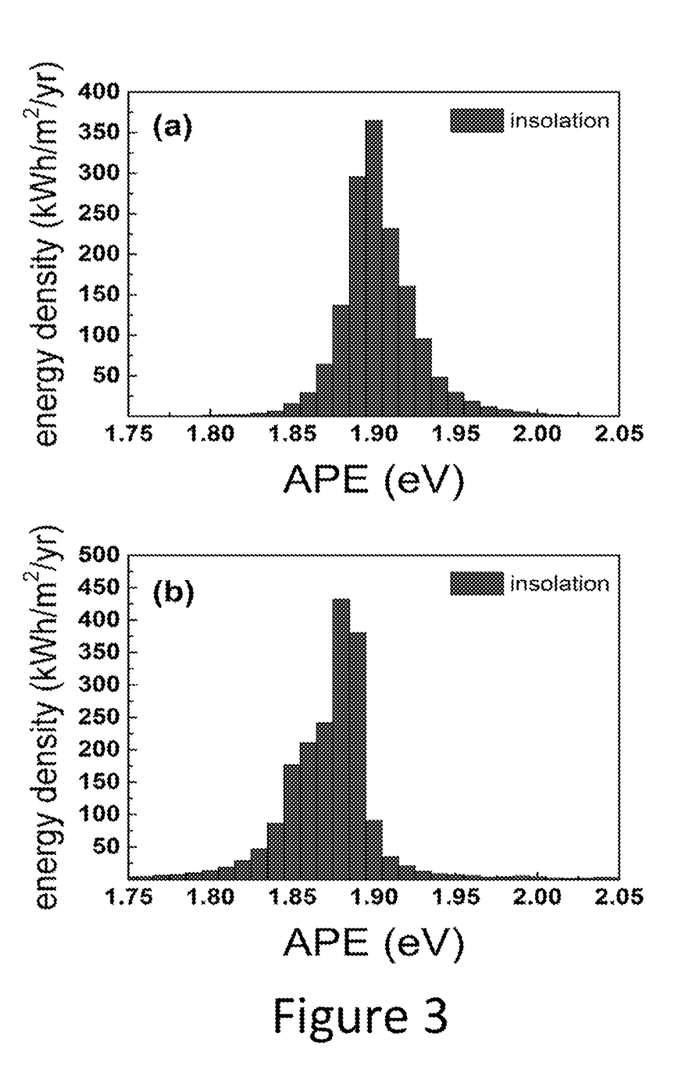
FIG. 3 shows the annual distribution of available insolation associated with different spectral compositions characterized by different APE values in (a) Singapore and in (b) Denver.

FIG. 3 shows the annual distribution of available insolation associated with different spectral compositions characterized by different APE values in (a) Singapore and in (b) Denver.

Figure 4:
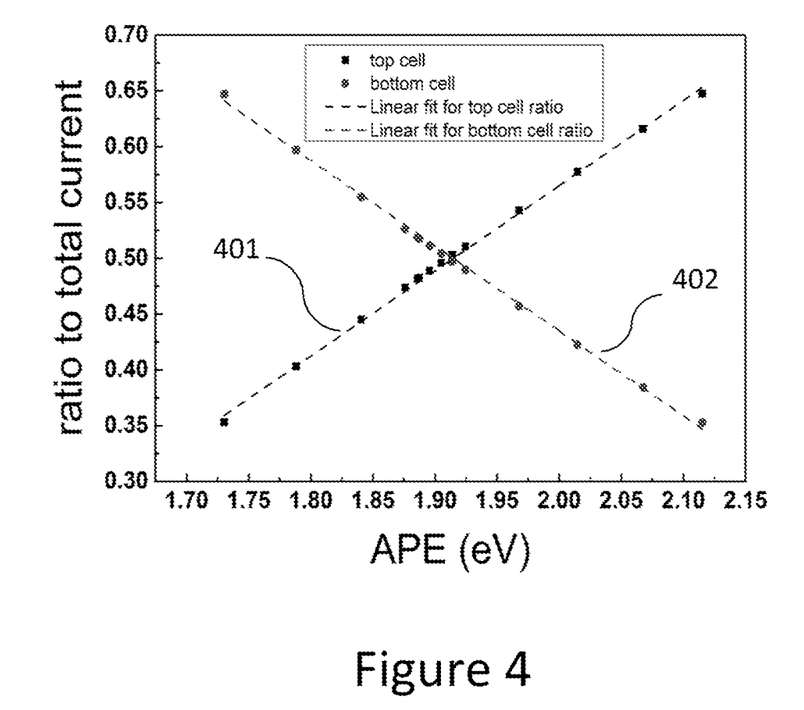
FIG. 4 shows the ratio of sub-cell currents to the total current for the InGaP on Si tandem solar cell, according to an example embodiment. A nearly linear relationship is obtained. This can be used to calibrate sensor response to give off APE readings, according to example embodiments.

FIG. 4 shows the ratio of sub-cell currents to the total current for the InGaP (curve 401) on Si (curve 402) tandem solar cell, according to an example embodiment. A nearly linear relationship is obtained. This can be used to calibrate sensor response to give off APE readings, according to example embodiments.

Elements of a spectrum sensor according to an example embodiment can include:

i) Two or more photo-sensors, sensitive to different parts of the solar spectrum. The photo-sensors generate signals (e.g., current and/or voltage) depending on the part of the solar spectrum they are sensitive to and the illumination conditions. Specific properties (current, and/or voltage) are recorded. Embodiments of the photo-sensors with sensitivities to different parts of the solar spectrum can be: i) solar cells or common photo-diodes made from different base materials, ii) solar cells or photo-diodes made from the same material and capped with optical filters that have different spectral transmissivity. The solar cell or photodiode devices can be physically placed side by side or stacked on top of each other. An exemplary device uses two solar cells, a Si and a GaInP solar cell. Embodiments of this can especially be 2n (n being the number of solar-cell base materials used) terminal stacked solar cells, or solar cells or photo-diodes that are operated separately.

This optical setup alone distinguishes embodiments of the present invention especially from devices that use prisms or linear photodiode arrays, as can be found, for example, in spectrophotometers. In photodiode arrays, incoming light with different spectral components is usually spatially separated (e.g., using a prism), and light intensities in each "colour band" are measured using an array of many photo-diodes to reconstruct the solar spectrum, thus taking a direct measurement and reconstruction of spectral information. In contrast, embodiments of the present invention can use far fewer photo-sensors and employ an algorithm to infer spectral information. Furthermore, direct measurement needs careful calibration of all diodes at the same time, and is subject to distortion of shape as a result of different diode degradation rate. In embodiments of the present invention, quantum efficiency is advantageously relatively stable and thus photocurrent changes are expected to be small. Once the ratio is calibrated, embodiments of the present invention can preferably be more robust and less prone to distortion.

ii) A device for measuring properties of the photo-diodes (current/voltage), which can be any device providing that functionality. Examples include customized microcontrollers and microprocessors or any form of analog or digital control circuits equipped with measurement resistors and/or any other analog or digital circuit with capabilities to measure current/voltage. To perform the required measurements, a power source is used. This power source can be an external power source or an internal power source such as a battery. It is also possible to use solar cells (including those serving as photo-sensors for the measurement) for powering the system.

iii) A computing unit (which may comprise at least a processor and data storage) to perform calculations based on the output of the photo-diodes. The computing unit can be a microprocessor and can be integrated with the measurement device. The computing unit can also be in the form of common processing components like they are found in cell-phones, or personal computers (PCs) etc.

iv) The computing unit is configured to execute an algorithm that calculates characteristic functions from the measured quantities of the photo-sensors and relates those to the shape of the spectrum. A very small number of photo sensors (two or more) can be used, which is a smaller number than in existing photo-detectors or spectrum sensors. In example embodiments, this reduction is enabled by the algorithm that relates functions of the measured output to the spectrum shape, represented by its average photon energy (APE). APE is calculated from the spectrum shape and has been found to be a unique representation for the shape of a spectrum for a given location. In one embodiment, the algorithm comprises:

$$APE = \frac{\int_{\lambda_1}^{\lambda_2} I(\lambda)\, d\lambda}{\int_{\lambda_1}^{\lambda_2} \Phi(\lambda)\, d\lambda} = \frac{\int_{\lambda_1}^{\lambda_2} I(\lambda)\, d\lambda}{\int_{\lambda_1}^{\lambda_2} \frac{I(\lambda)}{hc/\lambda}\, d\lambda}$$

The algorithm relates the measured photo-sensor quantities to the APE, which in turn allows predicting the shape of the spectrum according to example embodiments.

This configuration of the computing unit distinguishes embodiments of the present invention especially from devices that approximate the human eye response, such as the TAOS (Texas Advanced Optoelectronic Solutions) TSL2560, TSL2561, and TSL25911. These TAOS devices are light intensity sensors designed to measure the illuminance of ambient light that falls within the visible spectrum (which approximates human eye response in that light environment). The information is calculated by integrating the output current (voltage) of two photo-diodes (one sensitive to the infrared; one sensitive to the visible+infrared), using solid-state circuit elements. The integrated current outputs from the two photo-diodes is then converted into a signal, with embedded information about the amount of incoming light (measured in lux) in the visible regime (as opposed to infrared). As will be appreciated by a person skilled in the art, the amount of incoming light (measured in lux) in the visible regime (as opposed to infrared) does not constitute accurate spectral information. Embodiments of the present invention are instead designed to, for example, measure the incoming solar spectrum for solar cells, which is not limited to the spectral regime of the human eye response. In example embodiments of the present invention, an algorithm to infer the incoming solar spectrum with full detail is instead applied, which makes use of (entire) solar spectrum simulation/database with known atmospheric properties and their statistical distributions of a target location. Embodiments of the present invention advantageously enable this inferring to be conducted, by determining the APE value of the solar spectrum from the measured photo current outputs based on a calibration of the sensor response and the algorithm mentioned above. That APE value in turn preferably uniquely identifies the (entire) solar spectrum, for example making use of a comparison with an on-board library of spectra.

It is noted that the components (photo sensors, measurement device, computing unit, and algorithm) can be extended to a larger set that also includes, for example: extended data storage, with embedded spectral information within the storage (e.g., library of spectra); a clock; and communication etc., which can help to e.g. make the gathered information accessible. All functions can be integrated into one device in such embodiments.

As mentioned above, embodiments of the present invention can allow creating spectrum sensors that are orders of magnitude smaller and cheaper than existing devices, and could be applied independently or incorporated in other devices like cell-phones (for measuring personal exposure to sunlight or air quality, for example), as facilitated by a simple sensor that can measure the average photon energy (APE) for locations with known spectrum characteristics according to example embodiments, and thus provides a simple method to recover real-time spectral composition, in which, for example, multijunction solar cells measure the relative proportion of photocurrents associated with different spectral bands.

Spectra Analysis and System Details According to Example Embodiments

A solar cell can experience a wide range of spectral compositions during its operation. The spectral compositions prevalent in a certain location depend on the sun position and also the atmospheric conditions of that location. The variety of spectral compositions can be sorted according to their average photon energy values. Although one APE value can correspond to many different possible spectral shapes, studies suggest that spectral composition corresponding to one APE value is pretty unique for a fixed location [7].

Therefore, APE has been recognized by the inventors as a particular useful number to represent different spectra, and in doing so advantageously reduces the dimension of information needed. For illustration, the inventors sorted the measured spectra from Singapore and Denver in the year of 2014 into bins of different APE values, with an interval of 0.05 eV. Then the average spectrum within each bin was taken and the representative spectra for different spectral compositions generated. These representative spectra are shown in FIGS. 2 (a) an (b). It should be noted that spectra from Singapore and Denver with the same APE value are different, compare e.g. curves 201 and 211. This is believed to be because the two locations have very different air mass, and atmospheric properties such as aerosol optical depth and water vapour content. However, the kind of possible spectral shape that can occur for one location was surprisingly found to be pretty consistent and predictable. It may be possible to use either existing spectrum measurements or use elaborate radiative transfer models to generate the characteristic spectrum set in different embodiments of the present invention.

Different spectra occur with different frequency. In terms of energy content, the available annual insolation associated with different spectral compositions is shown in FIG. 3. It can be seen that most insolation is concentrated within an APE range of about 0.5 eV.

Therefore, a sensor according to an example embodiment preferably is able to resolve APE difference of about or exactly 0.1 eV or less. It has to be noted that the difference between spectra shape with APE values that are close to each other is quite small (see FIGS. 2 a) and b)), even smaller than the allowed uncertainty range of 10% for a class A solar simulator. This would place stringent requirements on the accuracy of a measurement device if the device were to directly measure the spectral composition. It is thus unlikely that such device can be made as small and cheap. Nevertheless, the inventors have recognised that the subtle differences still cause a detectable change in photon flux distribution. Therefore, if a multijunction solar cell is placed under the varying spectra, the photocurrents in each sub-cell will change accordingly. This is advantageously used to infer the APE and thus the spectral composition of the incoming spectrum, according to example embodiments of the present invention.

Product Specifications According to Example Embodiments

Example embodiments of the sensor use multijunction solar cells and measure the photocurrent distribution in different sub-cells. The multijunction solar cell can be made from sub-cells with different bandgaps, or simply Si solar cells coated with different optical filters. To determine the optimum number of junctions and bandgap combinations, the spectrum was partitioned into several spectral bands and it was studied how photon flux (or photocurrent) within each band changes with changing APE. Spectral band partitions corresponding to bandgap partitions of InGaP (685 nm)/Si (1120 nm), GaAs (870 nm)/Si, InGaP/GaAs/Si were tried, and also equal band partition every 50 nm. Various other partition schemes can also be realized with optical filters. The sub-cell currents under the characteristic set of spectrum in Singapore were calculated, assuming 100% external quantum efficiency (EQE) up to their respective bandgaps, and their ratio was taken to the sum of all sub-cell currents. We found that the bandgap combination of InGaP and Si yielded the best result in the current studies, but the present invention is not limited to this bandgap combination. FIG. 4 shows the ratio of sub-cell currents for InGaP/Si tandem in Singapore. A nearly linear relationship (in fact slightly parabolic) between the ratios and APE is obtained, see curves 401 and 402.

This can be used to conveniently calibrate the sensor response and APE reading output. Similar linear relationships are also obtained with GaAs/Si and InGaP/GaAs/Si, but not with equal partition every 50 nm. It should also be noted that the larger the gradient, the better the sensor sensitivity. InGaP/Si gives the best theoretical sensitivity as the bandgap partition line lies nearly at the "pivot" wavelength of the spectrum set (see FIGS. 2 a) and b)). In this case, two junctions are preferably sufficient and also most desired in yielding the required information of spectrum shape. This provides a simple means to perform APE measurement. The results calculated with the characteristic spectrum set of Denver was also similar. Similar results were also obtained with realistic EQEs of sub-cells, except with smaller gradient (thus smaller sensitivity).

Depending on the intensity of the incoming light, the absolute changes in sub-cell currents will vary, but the ratio of the two currents will advantageously remain the same. It will be appreciated by a person skilled in the art that the sensor resolution of photocurrent change and detector area can be properly chosen to reach a required sensitivity and/or to improve signal to noise ratio. As mentioned above, the measurement can be potentially realized by an Arduino or a customized circuit in example embodiments.

The spectral composition of sunlight can change abnormally when abnormal atmospheric conditions are present, such as due to haze. This will reflect in the changing APE values measured according to example embodiments. Similarly, spectral composition in shaded areas show large deviations due to exceptionally rich diffuse irradiance. The spectrum sensor according to example embodiments can in advantageously pick this up. In these cases, simple calibration based on graphs such as those discussed above with reference to FIG. 4 may not be fully sufficient in all application cases. However, more elaborate algorithms that can assimilate additional information, such as use of machine learning and natural language processing algorithms (in combination with other databases, including ones online), can be employed in different embodiments.

Embodiments of the present invention can solve the problem of allowing to predict the shape of the solar spectrum with a small number of measurements (2 or more). As mentioned above, conventional spectrum measurements require a large number of measurements to obtain an acceptable resolution, which makes the used devices expensive and relatively large. In example embodiments of the present invention, the necessity for optical elements and a large number of measurements is advantageously replaced with a technique that is unique for each location and allows reducing the number of required measurements for a full prediction of the solar spectrum to as few as 2. The minimum information used in example embodiments is the current within two different wavelength ranges. In a preferred embodiment, the photon flux (corresponding to solar cell current) approximately between 300 nm (there is little light making it to the earth's surface below that) and 800 nm on the one hand, and between 800 nm and 1200 nm on the other hand are measured.

In one embodiment a silicon sub-cell would measure approximately until 1200 nm, and a InGaP sub-cell cell until 800 nm. The required information for determining the APE and hence the solar spectrum can be calculated from these two currents, according to example embodiments. However, any measurement of two different photon wavelength/energy ranges can be used to determine the APE and hence the solar spectrum according to example embodiments.

Measurements can be realized with a sensor device that comprises, in one embodiment, (at least) two photodiodes, a measurement device and a computing unit, according to an example embodiment, as described above with reference to FIG. 1a). In another embodiments, measurements can be realized with a sensor device that comprises, in one embodiment, one photodiode, (at least) two filters, a measurement device and a computing unit, as described above with reference to FIG. 1b). The functionality can be realized in a single chip in preferred embodiments, which can potentially be produced very cheaply and very small. This chip can be integrated in any other devices, but can also be fabricated into a single measurement unit.

Existing spectro-photometers, which lack a predictive algorithm and thus require these devices to do much more elaborate measurements to generate a spectrum shape with enough resolution, which makes these devices larger and more expensive than our suggested solution.

In one embodiment, a solar spectrum sensor is provided comprising a sensor unit configured for generating respective photo current outputs responsive to different parts of the solar spectrum; a measurement unit configured for measuring the respective photo current outputs from the sensor unit; and a processing unit for determining an average photon energy, APE, value of the solar spectrum from the measured photo current outputs and for determining the solar spectrum based on the determined APE.

The sensor unit may comprise at least two sensor elements with different materials responsive to the different parts of the solar spectrum. The solar spectrum sensor may comprise more than two sensor elements comprising different materials responsive to more than two different parts of the solar spectrum.

The sensor unit may comprise at least two optical filters having different transmissivities coupled to one or more sensor elements with materials responsive to the same or substantially the same part of the solar spectrum. The solar spectrum sensor may comprise more than two sensor elements comprising materials responsive to the same or substantially the same part of the solar spectrum, and the solar spectrum sensor further comprises more than two optical filters coupled, respectively, to the more than two sensor elements, the optical filters having different transmissivities The sensor elements may comprise small area solar cells or photo-diodes.

The solar spectrum sensor may further comprise a database storing reference solar spectrum data indexed by APE values. The solar spectrum sensor may comprise an internal data storage medium for the database such as a hard drive or solid-state memory. The solar spectrum sensor may comprise an interface for connecting to an external data storage medium for the database such as an SD card or thumb drive, and/or to a remote data storage medium for the database via wired or wireless connection.

Figure 5:
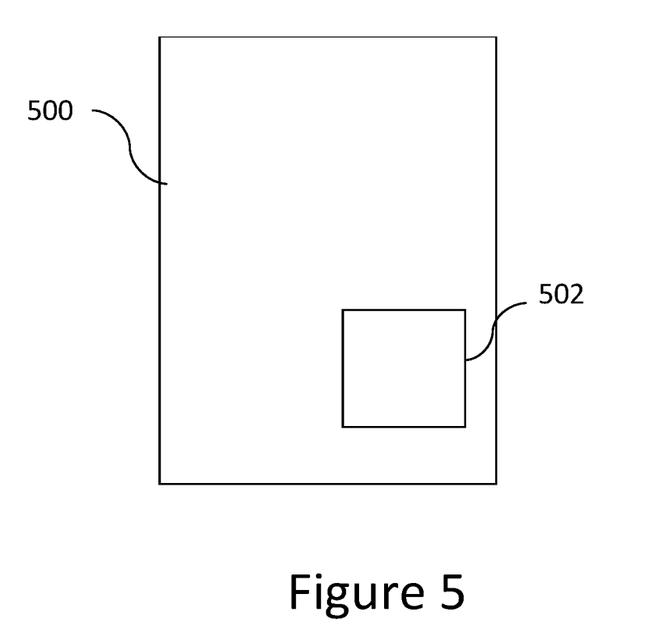
FIG. 5 shows a schematic drawing illustrating a consumer device comprising a solar spectrum sensor, according to an example embodiment.

In one embodiment, a consumer device 500 is provided comprising a solar spectrum sensor 502 of the above embodiment. The consumer device 500 may be in the form of a mobile or cell phone or any device for which a solar spectrum analysis is required.

Figure 6:
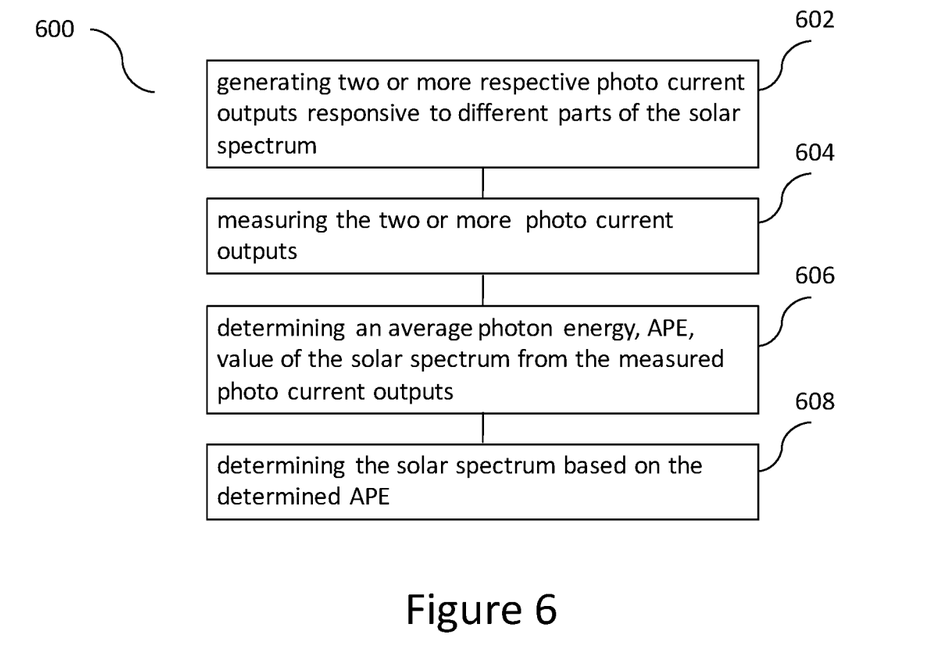
FIG. 6 shows a flow-chart illustrating a method for determining an ambient solar spectrum, according to one embodiment.

FIG. 6 shows a flow-chart 600 illustrating a method for determining an ambient solar spectrum, according to one embodiment. At step 602, two or more respective photo current outputs responsive to different parts of the solar spectrum are generated. At step 604, the two or more photo current outputs are measured. At step 606, an average photon energy, APE, value of the solar spectrum is determined from the measured photo currents. At step 608, the solar spectrum is determined based on the determined APE.

INDUSTRIAL APPLICATIONS OF EXAMPLE EMBODIMENTS

Sensors according to example embodiments of the present invention can be used to measure the shape of the solar spectrum. This information is useful in predicting the power output of solar cells, correcting irradiance measurements made by sensors with non-unity spectral response, PV system performance monitoring, or assessing the environment. Examples are measuring haze or smog, measuring air quality, measuring humidity, measuring UV exposure (which can be used to recommend countermeasures like a certain sun-blocker).

As such, the main applications include:
Photovoltaics,
Meteorology,
Building technology
Mobile devices (cell phones, mobile sensors), enabling
    measuring haze or smog,
    measuring air quality,
    measuring humidity,
    measuring UV exposure
    recommend countermeasures like sun blockers or moisturizing creams
PV powered Tracking of goods (as an enabling technology)
Agriculture and horticulture
Weather prediction It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive. Also, the invention includes any combination of features, in particular any combination of features in the patent claims, even if the feature or combination of features is not explicitly specified in the patent claims or the present embodiments.

For example, to more accurately predict the shape of the solar spectrum, an accurate database can be made available of the shape of the spectrum at different times, and various different approaches to building such a database can be employed, as will be appreciated by the person skilled in the art.

To address deviations/uncertainties that may be present, using embodiments of the present invention to generate data at many different locations, which can then be used to refine the algorithm, may be employed. The uncertainty can also be reduced by increasing the number of photodetectors. Solar spectrum modelling is also possible using satellite derived atmospheric measurements and existing radiative transfer models. Alternatively, other spectrum measurement devices can be employed initially to generate the required database. Another limitation is that the described device can only be used to predict the solar spectrum.
Other light sources are not covered Other modifications of embodiments of the present invention can include:
Miniaturized version of the devices for inclusion in, for example, mobile devices (cellphones, mobile meteorological stations).

A network of communicating sensing units, to track local distribution of illumination conditions.

REFERENCES

[1] Y. Jia Ying, T. Reindl, A. G. Aberle, and T. M. Walsh, "Effect of Solar Spectrum on the Performance of Various Thin-Film PV Module Technologies in Tropical Singapore," Photovoltaics, IEEE Journal of, vol. 4, pp. 1268-1274, 2014.
[2] P. Faine, S. R. Kurtz, C. Riordan, and J. M. Olson, "The influence of spectral solar irradiance variations on the performance of selected single-junction and multijunction solar cells," Solar Cells, vol. 31, pp. 259-278, 1991.
[3] G. S. Kinsey, "Spectrum Sensitivity, Energy Yield, and Revenue Prediction of PV Modules," IEEE Journal of Photovoltaics, vol. 5, pp. 258-262, 2015.
[4] *International Electrotechnical Commission* (IEC), "Photovoltaic system performance monitoring—Guidelines for measurement, data exchange and analysis," IEC 61724, 1998.
[5] N. H. Reich, B. Mueller, A. Armbruster, W. G. J. H. M. van Sark, K. Kiefer, and C. Reise, "Performance ratio revisited: is PR>90% realistic?" Progress in Photovoltaics: Research and Applications, vol. 20, pp 717-726, 2012.
[6] R. Mueller, T. Behrendt, A. Hammer, and A. Kemper, "A New Algorithm for the Satellite-Based Retrieval of Solar Surface Irradiance in Spectral Bands," Remote Sensing, vol. 4, p. 622, 2012.
[7] T. Minemoto, Y. Nakada, H. Takahashi, and H. Takakura, "Uniqueness verification of solar spectrum index of average photon energy for evaluating outdoor performance of photovoltaic modules," Solar Energy, vol. 83, pp. 1294-1299, 2009.

The invention claimed is:

1. A solar spectrum sensor comprising:
   a sensor unit configured for generating respective photo current outputs responsive to different parts of the solar spectrum;
   a measurement unit configured for measuring the respective photo current outputs from the sensor unit; and
   a processing unit for determining an average photon energy, APE, value of the solar spectrum from the measured photo current outputs and for determining the solar spectrum based on the determined APE.

2. The solar spectrum sensor of claim 1, wherein the sensor unit comprises at least two sensor elements with different materials responsive to the different parts of the solar spectrum.

3. The solar spectrum sensor of claim 2, comprising more than two sensor elements comprising different materials responsive to more than two different parts of the solar spectrum.

4. The solar spectrum sensor of claim 1, wherein the sensor unit comprises at least two optical filters having different transmissivities coupled to one or more sensor elements with materials responsive to the same or substantially the same part of the solar spectrum.

5. The solar spectrum sensor of claim 4, comprising more than two sensor elements comprising materials responsive to the same or substantially the same part of the solar spectrum, and the solar spectrum sensor further comprises more than two optical filters coupled, respectively, to the more than two sensor elements, the optical filters having different transmissivities.

6. The solar spectrum sensor of claim 1, wherein the sensor elements comprise small area solar cells or photodiodes.

7. The solar spectrum sensor of claim 1, further comprising a database staring reference solar spectrum data indexed by APE values.

8. The solar spectrum sensor of claim 7, comprising an internal data storage medium for the database such as a hard drive or solid-state memory.

9. The solar spectrum sensor of claim 7, comprising an interface for connecting to an external data storage medium for the database such as an SD card or thumb drive, and/or to a remote data storage medium for the database via wired or wireless connection.

10. A consumer device comprising a solar spectrum sensor of claim 1.

11. A method for determining an ambient solar spectrum, the method comprising:
    generating two or more respective photo current outputs responsive to different parts of the solar spectrum;
    measuring the two or more photo current outputs;
    determining an average photon energy, APE, value of the solar spectrum from the measured photo current outputs; and
    determining the solar spectrum based on the determined APE.

12. The consumer device of claim 10, in the form of a mobile or cell phone.

* * * * *